C. L. POST.
ENVELOPE HANDLING DEVICE.
APPLICATION FILED AUG. 14, 1919.

1,437,443.

Patented Dec. 5, 1922.
5 SHEETS—SHEET 1.

Inventor
Claude L. Post
Hill & Hill
Attys.

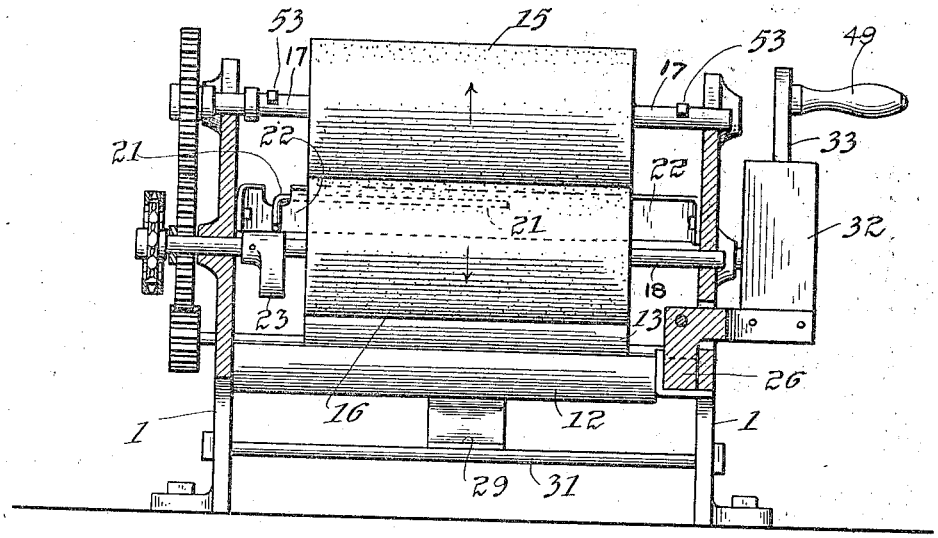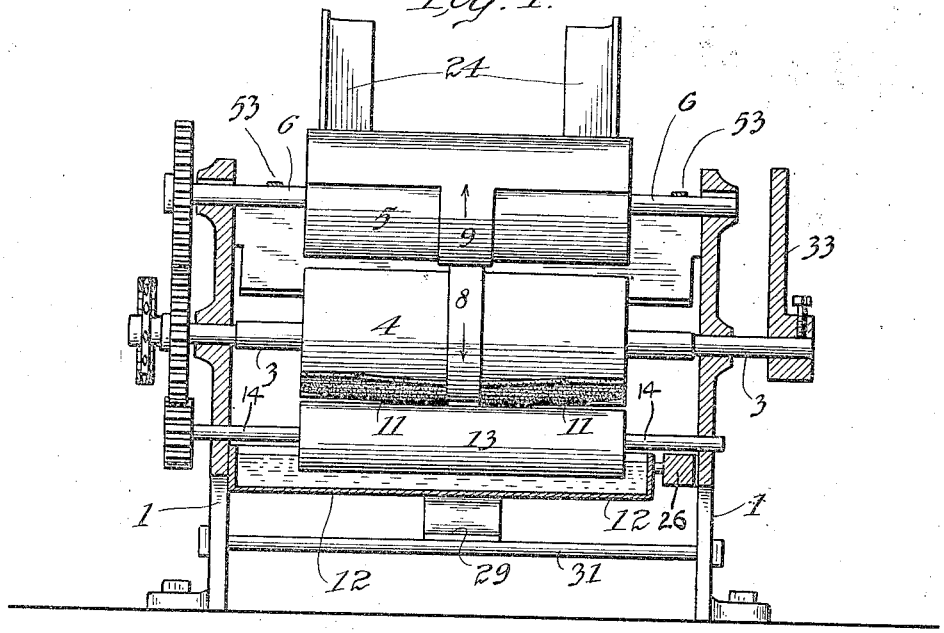

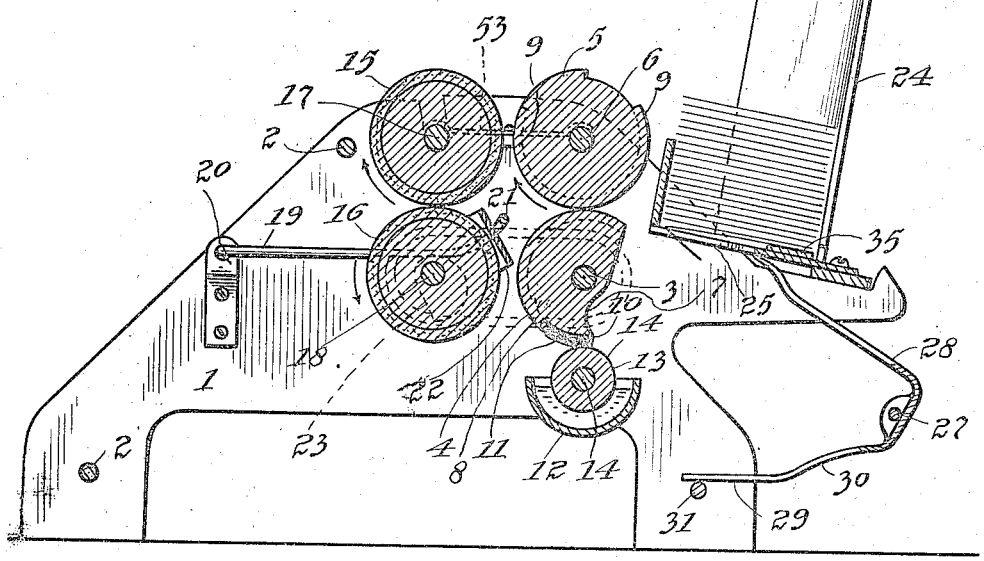
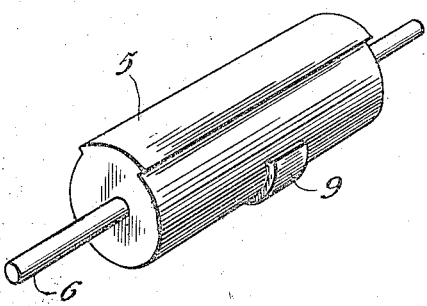
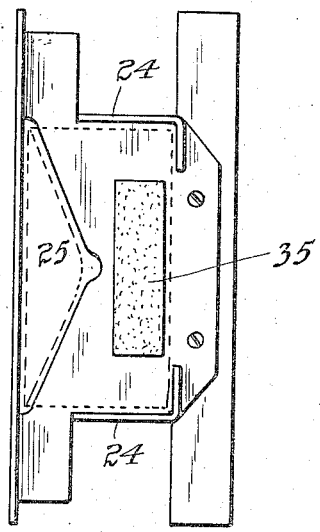
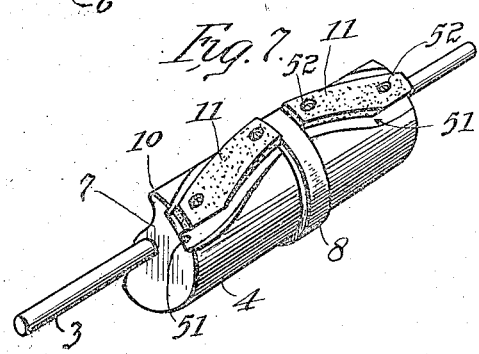

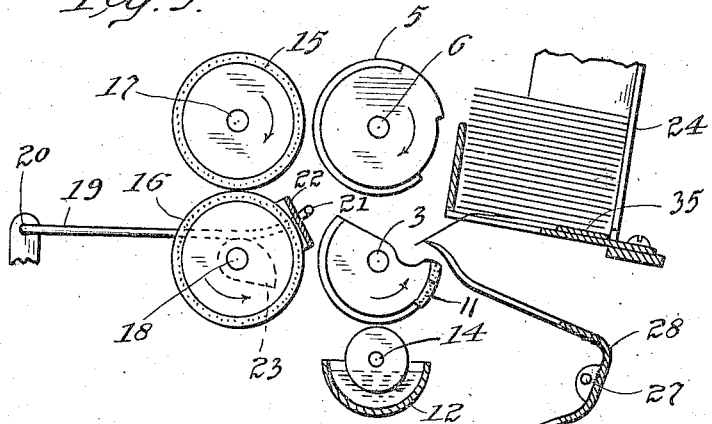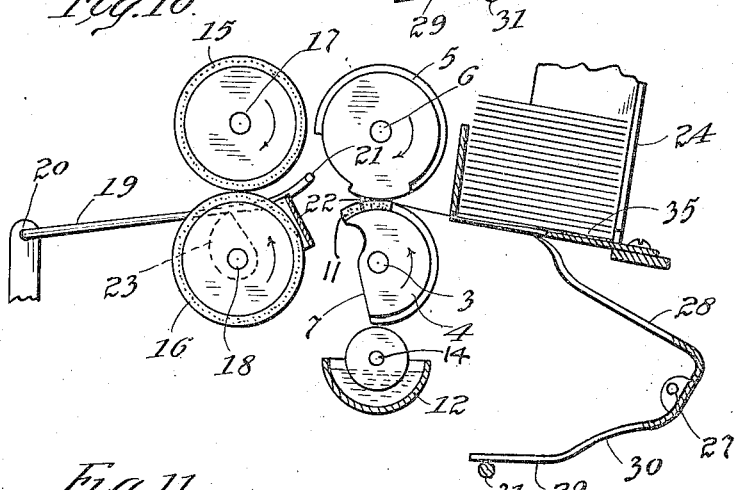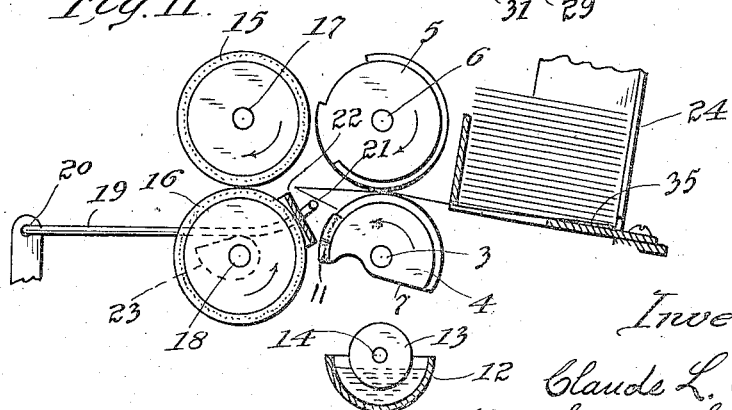

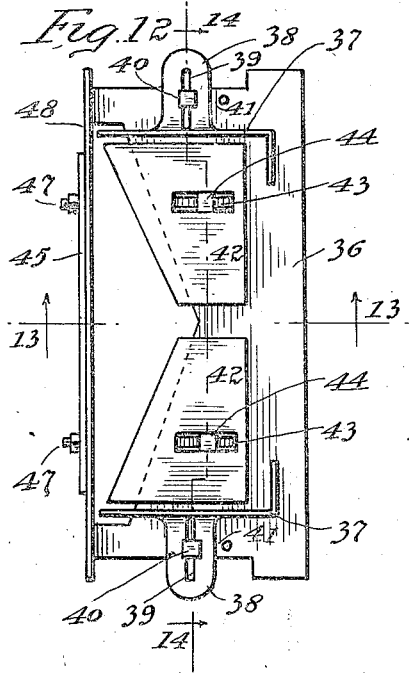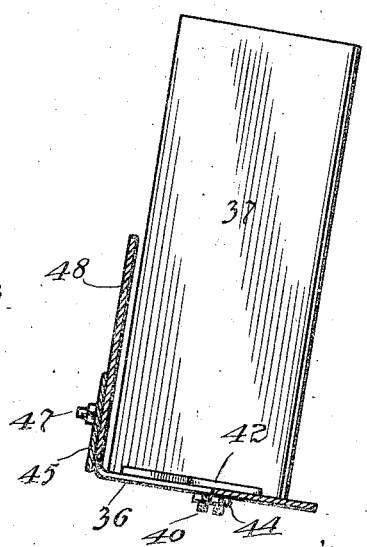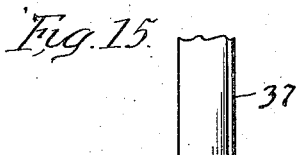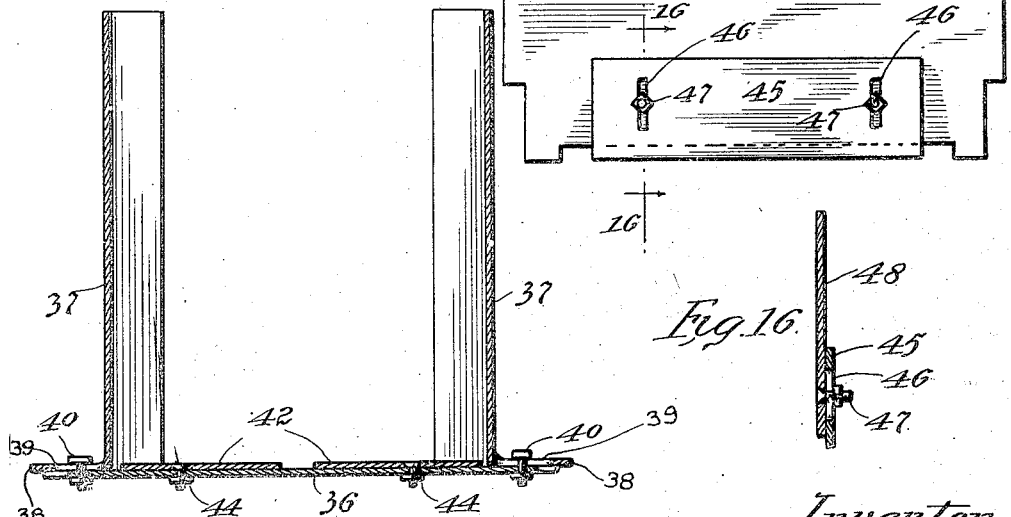

Patented Dec. 5, 1922.

1,437,443

UNITED STATES PATENT OFFICE.

CLAUDE L. POST, OF CHICAGO, ILLINOIS.

ENVELOPE-HANDLING DEVICE.

Application filed August 14, 1919. Serial No. 317,504.

*To all whom it may concern:*

Be it known that I, CLAUDE L. POST, a citizen of the United States, residing at Chicago, in the county of Cook and State of Illinois, have invented certain new and useful Improvements in Envelope-Handling Devices, of which the following is a description.

My invention belongs to that general class of devices adapted to handle envelopes, and during their passage through the machine to be subjected to certain manipulation or handling beneficial or necessary. The present machine as shown and described is particularly adapted for handling an envelope which has been filled, and to seal the envelope as it passes through the machine. It has for its object the production of such a machine which shall be simple in construction, durable in operation and reliable at all times to perform the functions designed. To this end my invention consists in the novel construction, arrangement and combination of parts herein shown and described, and more particularly pointed out in the claims.

In the drawings, wherein like reference characters indicate like or corresponding parts, Fig. 1 is a side elevation of my improved machine constructed for hand operation;

Fig. 3 is an end elevation looking from the front or the discharge end of the device, partly in section to show the construction;

Fig. 4 is an elevation showing the feeding and dampening or gumming rolls, the sealing rolls being removed and parts in section to illustrate the construction;

Fig. 5 is a section substantially on line 5—5 of Fig. 2;

Figs. 6 and 7 are detail views of the feeding and dampening or gumming rolls;

Fig. 8 is a plan view of an envelope magazine designed for use with my device;

Figs. 9, 10 and 11 are partial sectional views similar to Fig. 5 showing the parts in different positions;

Fig. 12 is a plan view of an envelope magazine adapted to be adjusted to feed envelopes of different sizes;

Fig. 13 is a sectional view of the same on line 13—13 of Fig. 12;

Fig. 14 is a longitudinal view of the same on line 14—14 of Fig. 12;

Fig. 15 is a view taken from the left of Fig. 13 showing means for adjusting the opening from the envelope magazine to accommodate envelopes filled to a greater or less extent; and Fig. 16 is a section taken on line 16—16 of Fig. 15.

Figure 1:
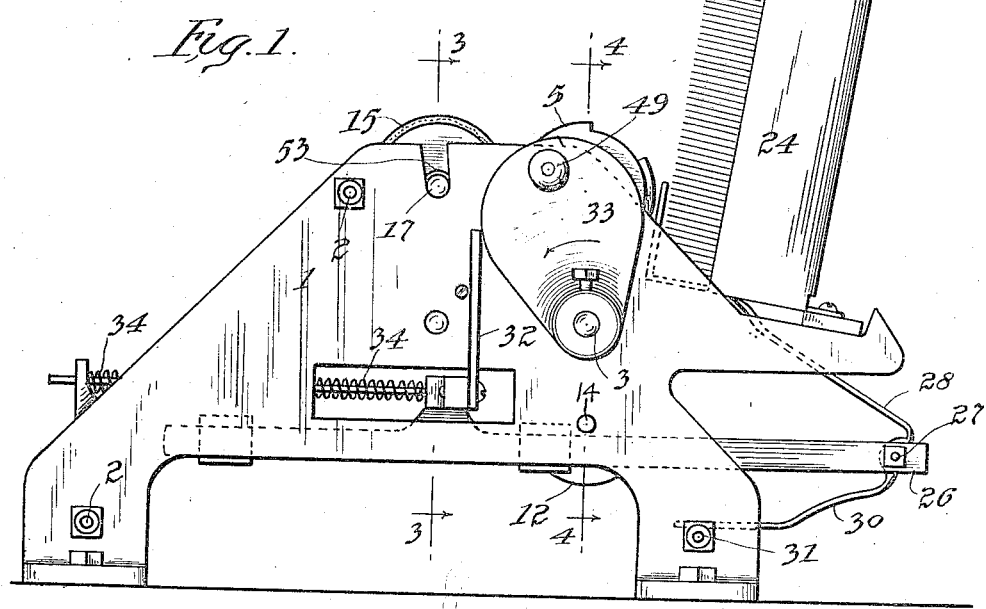

In the drawings, 1, 1 is a suitable frame structure properly connected with cross bars 2, 2, etc., to support the mechanism. 3 is a shaft carrying upon it a suitable roller 4 (Fig. 7) which is supported in suitable bearings in the frame structure of the apparatus, which in the preferred form shown performs the double function of feeding the envelopes and treating the lower surface of the flap near the marginal edge thereof so that as the flap is pressed down upon the body of the envelope again it will adhere thereto. This may be done either by applying suitable moisture or water to the gummed flap, or by initially applying a suitable quantity of gum or paste thereto.

This roller is an important part of my invention, cooperating with the companion roller 5 carried upon a shaft 6 preferably mounted above the shaft 3. These rollers in the preferred form are so constructed that at one point in their rotation the flap of the envelope may be positioned between them, a sufficient clearance between the rollers being provided for that purpose in any preferred manner, for illustration by cutting away a portion of the roller 4 as at 7, which will permit the flap of the envelope to be pushed thereover as more clearly shown in Fig. 9. Both the roller 4 and the roller 5 are preferably provided with elevated nipping ridges 8 and 9 which cooperate to seize the extended flap of the envelope and draw the envelope through between the rolls. As shown, the forward edge of the segmental portion of the roll 4 is cut out to form an extending finger 10, which serves the purpose as the flap of the envelope is positioned above the feeding ridge 8, should the flap be inclined to curl downward, to unroll the flap somewhat so that as the cooperating ridges 8 and 9 come together they will seize the straightened edge of the flap of the envelope so as not to wrinkle it. While it is not absolutely necessary that the feeding ridge 9 of the roll 5 should be cut away at any portion in the circumference of the roll, I prefer to construct it substantially as shown in the drawings, more clearly illustrated in Fig. 6, so that there is an open space on the surface of said roll substantially registering with the segmental or cut out portion 7 of the roller 4.

Arranged upon the face of the roll 4 and extending generally in a longitudinal direction thereof is a pad 11 which is so arranged as to conform to the contour of the extended flap of the envelop. This may be made in two parts as shown in Fig. 7, extending in each direction from the gripping ridge 8, and be adjustable so as to slightly change its contour, or it may extend over said central ridge if preferred, although the construction shown has proven entirely satisfactory in operation.

Figure 2:
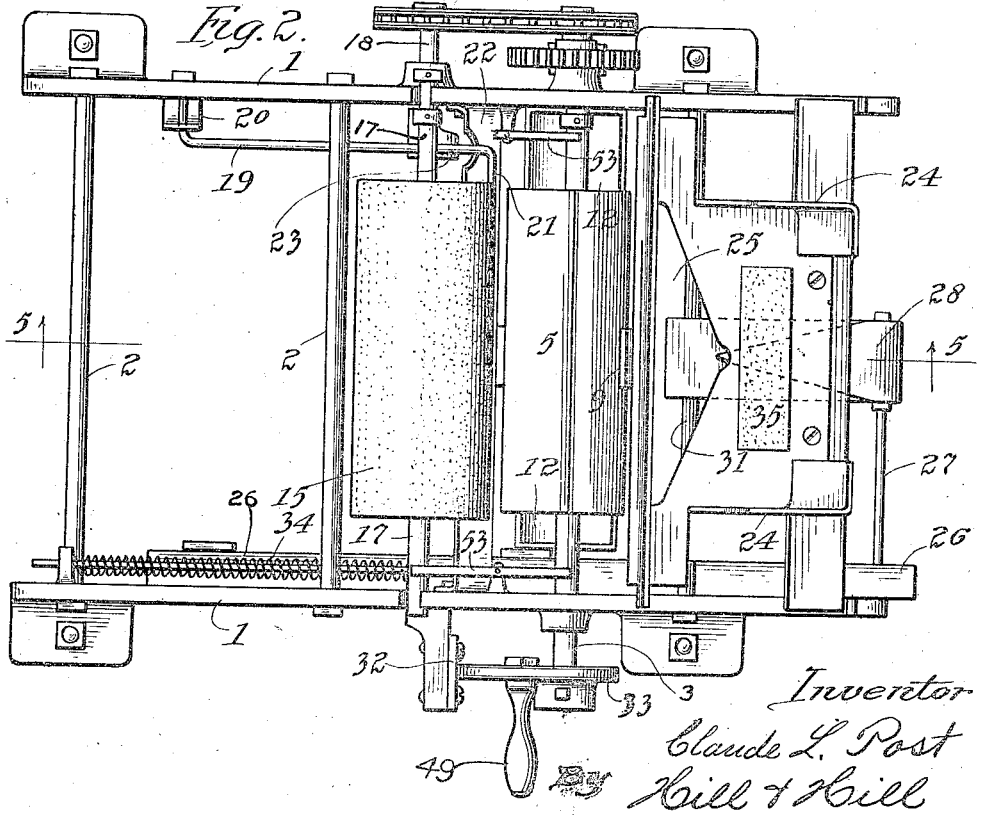
Fig. 2 is a plan view of the same.

Arranged below the roller 4 is a receptacle 12 adapted to contain water or other suitable material to aid in sealing the envelopes. Extending longitudinally within the receptacle is a roller 13 mounted upon the shaft 14. The roller is partly submerged throughout its length in the fluid within the receptacle, and is so positioned that as the roller 4 rotates the pad 11 will be brought in contact with the surface of the roll 13, serving to provide the pad with sufficient fluid for the purpose described. The rolls 4, 5 and 13 are geared, as illustrated in Figs. 2, 3 and 4, or otherwise suitably connected so that they are timed to cooperate as described. The timing of the roll 13 is not of great importance, but the timing of the rolls 4 and 5 is of importance in order that they may cooperate to suitably grasp the extending edge of the flap of the envelope as stated.

A pair of sealing rollers 15 and 16 mounted upon shafts 17 and 18 are arranged forward of the rollers 4 and 5, and are positioned to receive the envelopes as they are fed therethrough by said latter rollers. These rollers are preferably covered with some yielding material such as felt or other suitable material. A rod or bar 19 is pivotally supported upon the forward end of frame 1 as at 20 in such manner that the rear end 21 bent at a right angle to the bar 19 and positioned in the space between the feeding rollers and the sealing rollers may be freely reciprocated up and down, preferably falling to its downward position by gravity. A diverting plate 22 or an equivalent part lying forward of the extension 21 cooperates therewith in directing the folding of the extending flap of the envelope downward as it proceeds on its course, so that as the forward edge of the envelope reaches the sealing rollers 15—16, the flap is folded downward upon the envelope in position to be sealed. The shaft 18 carries upon its end a cam 23 arranged in line with the bar 19 so that as the shaft 18 rotates, the bar 19 with its extending arm 21 will be alternately raised and permitted to fall, the forward end of this arm 19 being mounted for a pivotal movement.

This movement is timed to cooperate with the feeding rollers 4—5, so that as the envelope with its flap extended proceeds on its way, the arm 21 gently falls on the extended flap, bending it downward in such manner that as the envelope passes over the plate 22, the flap is properly positioned to be sealed upon the envelope. See Figs. 9, 10 and 11.

The envelopes are delivered to the device preferably in the following manner. The magazine 24 is positioned in proximity to the rear of the rolls 4 and 5, as shown in the several drawings, and the envelopes are stacked therein one on the other with the flaps downward and the flap edge of the envelope forward toward the machine. The magazine has its bottom in proximity to the rollers cut out as at 25, so that the flaps of the envelopes register somewhat therewith and extend therethrough. The bottom of the magazine is substantially in alignment with the feeding plane of the rollers 4 and 5. A bar 26 arranged preferably near one side of the machine and supported so that it may be reciprocated longitudinally, is provided with an extending arm 27 carrying a finger 28 with its end positioned beneath the lower end of the magazine in such manner that as the bar 26 is reciprocated forward and backward, the finger will successively engage the flaps of the envelopes positioned at the bottom of the magazine and serve to open said flaps in a direction toward the feeding rollers, as shown in Figs. 9 and 11. The finger 28 is preferably a bell crank lever in form, pivoted between its ends on the arm 27. The lower arm, as at 29, is provided with an angular part 30, and said arm, cooperating with the bar 31 upon which it rides, permits the free end of the finger 18 to move downward as the rebent portion 30 rides over the bar 31, as clearly illustrated in Fig. 9. It will be understood that the parts are somewhat exaggerated to more clearly illustrate the operation, and a gentle inclination may be provided in place of a rebent part 30 on the arm 29.

In the form shown, the bar 26 is provided with an arm 32 or equivalent part arranged in alignment with the cam 33 carried on the shaft 3. The bar 26 may be guided in its movement in any preferred manner, and in the form shown a retracting spring 34 (Figs. 1 and 2) serves to force the bar 26 backward to its normal position as the cam 33 releases from the arm 32.

As shown, a handle 49 on the cam 33 serves as a means to operate the device. In power driven machines, suitable belt connections or other means may be employed to drive the machine.

In the preferred form, the moistening pads 11 may be adjusted sufficiently on the roller 4 to properly moisten the flaps of envelopes of different sizes. As shown, a groove 51 in the face of the roller is formed of such size as to permit adjustment of the pads therein, the pads being secured to the roller in any preferred manner, as by screws 52, the heads being sunk sufficiently to prevent any interference with the operation of the pads.

In the preferred form also, the feed rollers as well as the sealing rollers are resiliently maintained in operative relation to each other to accommodate filled envelopes of different thicknesses. This may be accomplished in any preferred manner. As shown, springs 53 are secured to a part of the machine, with the ends extended and resting upon the tops of the shafts 6 and 17 near the ends thereof.

As thus described, the operation is substantially as follows. Upon rotating the shaft 3, the various cooperating rollers suitably connected for the purpose are rotated sufficiently in unison for the purpose stated, the cam 33 contacts with the arm 32, causing the bar 26 to move forward, the finger 28 thus carried forward is inserted beneath the flap of the lowermost envelope, and carrying the same forward, drops downward as shown in Fig. 9, unfolding the flap and bringing it into the path of the feeding rollers 4 and 5. The nipping ridges 8 and 9 or their equivalent, seize the extending flap and draw the envelope from beneath the pile of envelopes in the magazine. As the envelope is drawn forward, assuming that the edge of the flap has been gummed in the usual manner, the pads 11 on the roller 4 have taken up sufficient moisture from their contact with the roller 13 in the fluid receptacle 12, to sufficiently dampen the gum upon the flap. As the envelope moves onward, the extending flap is positioned beneath the arm 21 which is timed to fall at a suitable point, bending the flap downward so that as the envelope proceeds on its way the plate 22 cooperates to replace the flap in position upon the body of the envelope, which then passing through between the sealing rollers 15 and 16 is discharged from the machine into a suitable receptacle. The entire operation is extremely simple and reliable.

In some cases I prefer to place something in the bottom of the envelope magazine to slightly retard the movement of the envelope as the stack grows lower as the magazine is emptied. As shown, a piece of sand-paper or rubber 35 may be employed for that purpose. It is not always necessary, but possibly it adds something to the reliability of the operation.

The envelope magazine employed may be of such size as to accommodate the particular envelopes used, and being easily removable, a plurality of them may be provided, so that the particular one desired may be selected. In some cases it may be desired that a single magazine should be provided which would be adjustable to different sized envelopes. As shown in Figs. 12 to 16, such an adjustable magazine is illustrated. As here shown, 36 is the base of the magazine provided with enclosing ends 37 each provided with an extension 38 having a slot 39 formed therein. These ends may be secured in place by bolts 40 or equivalent means passing through the slots 39 and the base 36. Transverse slots 41 may be provided in the base so that the end pieces may be adjusted transverse to the base 36 in the same manner, adapting the said ends to adjustment to suit the varying length and also the width of the envelopes employed. 42—42 are plates resting upon the base 36 and adjustable transversely by slots 43 formed therein and connecting means 44 extending therethrough and beneath the base. Of course, the reverse construction is also obvious, in which the slot is arranged in the base with simple bolts extending from the plates 42 therethrough. Simple means may be provided to provide for adjustment of the opening beneath the front of the magazine, so that the latter may be adapted for envelopes which are somewhat thick as they are filled, or for thin envelopes. Thus if the opening were large enough for heavily filled envelopes, if the same machine should be used for thinner envelopes, it possibly might occur that the lower envelope would carry forward with it the one immediately above. In view of this I provide a simple slide 45 adjustably positioned upon the face of the magazine in any preferred manner. As illustrated, the plate is provided with slots 46 through which bolts 47 pass, provided with suitable nuts to secure the two together. The front of the magazine is indicated at 48. The operation is obvious.

It will be understood that where in the claims I use the term "moisten" the flap of the envelope, I mean to be understood either as wetting a gummed flap sufficiently so that it will adhere, or initially applying a suitable paste or gum to a flap which has not been so treated before, so that the flap as it is pressed down upon the body of the envelope will adhere thereto in the usual manner.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A device of the kind described, a pair of feeding rollers, said rollers having ridges thereon, and one of the rollers being provided with a moistening pad, an envelope magazine adjacent said rollers, means for successively feeding envelopes from said magazine to said rollers to be engaged thereby, and to have the flaps of the envelopes moistened by the pad carried by one of the rollers while in an open position, movable means for engaging the flap after it passes through the feeding rollers and for returning the same to a closed position, said means comprising a shiftable bar located in front of the feeding and moistening rolls, operating mechanism for shifting said bar including an operating cam engaging a rod extending forwardly from the bar, and sealing rollers arranged to press said moistened flap upon the body of the envelope said cam being rotated by one of said sealing rollers.

2. A device of the kind described, a pair of feeding rollers, said rollers having ridges thereon, and one of the rollers being provided with a moistening pad, an envelope magazine adjacent said rollers, means for successively feeding envelopes from said magazine to said rollers to be engaged thereby, and to have the flaps of the envelopes moistened by the pad carried by one of the rollers while in an open position, movable means for engaging the flap after it passes through the feeding rollers and for returning the same to a closed position, said means comprising a transverse shiftable bar, a pivoted supporting rod extending therefrom and a cam engaging said rod intermediate its ends for shifting the bar, and sealing rollers arranged to press said moistened flap upon the body of the envelope, said sealing rollers being positioned directly in front of the movable flap closing means and having relatively smooth compression surfaces.

3. In a device of the kind described, a pair of feeding rollers and means for engaging the extending flap of an envelope therewith, in combination with an oscillating arm arranged beyond the feeding rollers and extending in a longitudinal direction therewith, means for oscillating said arm, comprising a rod projecting therefrom and a cam cooperating therewith, the oscillating of the arm being timed to the feeding of the envelopes by the feeding rollers, whereby the extending flap of an envelope passing between the feeding rollers will be positioned below the oscillating arm, which in its downward movement tends to bend the flap downward to its initial position.

4. In a device of the kind described, a pair of feeding rollers, means for engaging the extending flap of an envelope therewith, in combination with an oscillating arm extending longitudinally of the rolls, means for oscillating said arm in timed relation to the rotation of the feeding rolls, and a plate cooperating with the oscillating arm, whereby the extending flap of an envelope passes below the oscillating arm, which in its downward movement bends the flap of the envelope downward, which thereafter contacting with the plate returns the flap to its initial position upon the envelope.

5. In a device of the kind described, a pair of feeding rollers, one of said rollers being provided with a moistening pad, and means for moistening said pad, in combination with an envelope magazine arranged in proximity to the feeding rollers, a reciprocating finger arranged to successively engage the flap of the lowermost envelope and bend the same downward and outward in the path of the feeding rollers, whereby the flap of the envelope in its passage is moistened, means for rebending the flap of the envelope to its initial position and pressing the same upon the body of the envelope, said rebending means being located between the feed rolls and the pressing means and constituting a guide for the envelope to be delivered to the pressing means.

6. In a device of the kind described, a pair of feeding rollers, means for moistening the flap of an envelope fed therethrough, and means for opening and extending the flap of an envelope in the path of the feeding rollers, in combination with a pair of sealing rollers arranged beyond the feeding rollers, one of said rollers provided with a cam, a rod pivotally secured at one end with the free end arranged between the feeding rollers and the sealing rollers and extending longitudinally therewith, the free end of the rod being reciprocated by contact with the cam, and a diverting plate arranged in proximity to the end of the reciprocating rod, whereby the flap of an envelope engaged by the feeding rollers is moistened as it passes therethrough, is then positioned beneath the end of the reciprocating arm which is timed to move downward and bend the flap upon the edge of the envelope, said flap then engaging with the cooperating plate, returning the flap to its initial position on the envelope, and the envelope is then passed through between the sealing rolls and is sealed thereby.

7. In a device of the kind described, a pair of feeding rollers, means for moistening the flap of an envelope fed therethrough, means for opening the flap of an envelope when fed to the feeding rollers, a pair of sealing rollers arranged beyond the feeding rollers, one of said sealing rollers operatively associated with a cam, a rod pivotally mounted at one end, an oscillating bar connected with the other end of the rod and disposed parallel with the sealing rollers, said rod being actuated by the cam operatively associated with the sealing rollers to return a flap to its initial position before the envelope is passed between the sealing rollers.

8. In a device of the kind described, a pair of feeding rollers, means for moistening the flap of an envelope fed therebetween, an envelope magazine arranged adjacent the feeding rollers, means for feeding envelopes from said magazine comprising a shiftable feeding member, sealing rollers located adjacent the feeding rollers, a cam carried by one of said rotating rolls for reciprocating said feeding member, flap bending means interposed between the sealing rollers and the feeding rollers, and mechanism operated by said sealing rollers for actuating said flap bending means to return a flap to its normal position before the envelope has passed between the sealing rollers.

9. In a device of the kind described, a pair of feeding rollers, means for moistening the flap of an envelope fed therebetween, an envelope magazine arranged adjacent the feeding rollers, means for feeding envelopes from said magazine comprising a shiftable feeding member, sealing rollers located adjacent the feeding rollers, flap bending means interposed between the sealing rollers and the feeding rollers, and mechanism operated by said sealing rollers for actuating said flap bending means to return a flap to its normal position before the envelope has passed between the sealing rollers, said flap bending means comprising an oscillating bar extending parallel with the sealing rollers, a shiftable rod upon which said bar is mounted, means for pivotally supporting said rod at one end and a rotating cam carried by one of the feeding rollers for shifting the said rod to oscillate the flap bending bar.

In testimony whereof, I have hereunto signed my name in the presence of two subscribing witnesses.

CLAUDE L. POST.

Witnesses:
JOHN W. HILL,
CHARLES I. COBB.